(No Model.)

G. H. GRIMM.
EVAPORATING PAN.

No. 422,400. Patented Mar. 4, 1890.

Witnesses.
P. S. Lowrie.
Geo. W. King.

Inventor
Gustave H. Grimm
By
Leggett and Leggett,
Attorneys.

UNITED STATES PATENT OFFICE.

GUSTAVE H. GRIMM, OF HUDSON, OHIO.

EVAPORATING-PAN.

SPECIFICATION forming part of Letters Patent No. 422,400, dated March 4, 1890.

Application filed March 23, 1889. Serial No. 304,453. (No model.)

*To all whom it may concern:*

Be it known that I, GUSTAVE H. GRIMM, of Hudson, in the county of Summit and State of Ohio, have invented certain new and useful Improvements in Evaporating-Pans; and I do hereby declare the following to be a full, clear, and exact description of the invention, such as will enable others skilled in the art to which it pertains to make and use the same.

My invention relates to improvements in evaporating-pans; and it consists in certain features of construction and in combination of parts hereinafter described, and pointed out in the claims.

Figure 1:
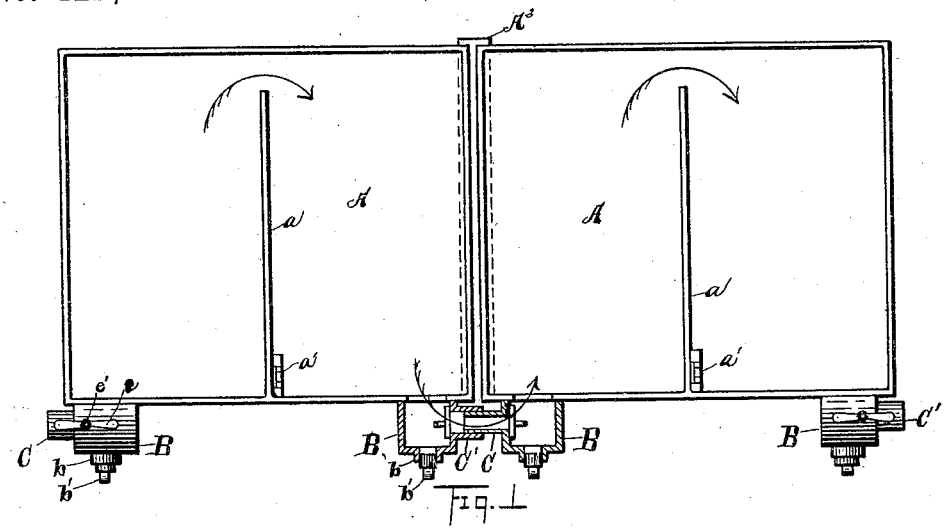
Figure 2:
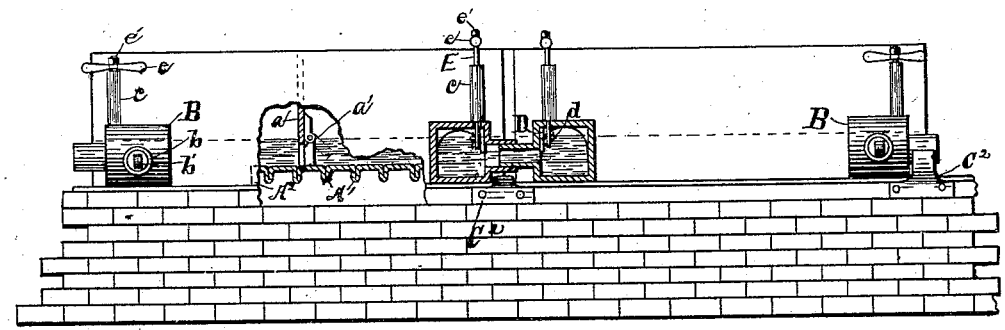
Figure 3:
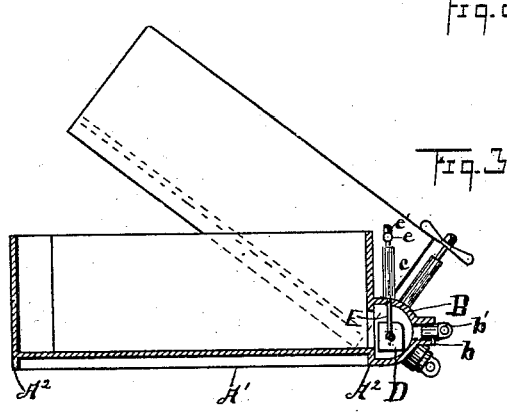
Figure 4:
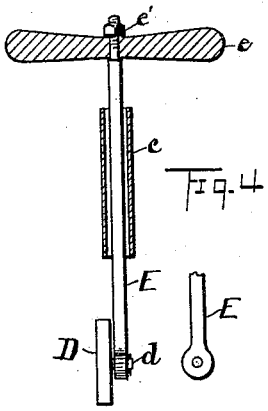

In the accompanying drawings, Figure 1 is a plan partly in section. Fig. 2 is a side elevation partly in section. Fig. 3 is an end elevation in section. Fig. 4 is an enlarged detail of the valve mechanism in elevation.

A A represent evaporating-pans, of which there may be any number in the series set over a suitable furnace.

Heretofore evaporating-pans have been constructed with so-called "corrugated" bottoms to increase the heating-surface. The objection to such pan is that they are difficult to clean, and the sediment that gravitates into the corrugations cannot well be removed while the pan is in operation. As an improvement I fold the sheet of metal of which the bottom of the pan is constructed at suitable intervals to form depending ribs A', the opposing sections being pressed together and the cracks being soldered so that the bottom of the pan presents a smooth surface internally. The ribs strengthen the pan equally well as the corrugations, and if the same area of metal is used in constructing the bottom of the pan, the two varieties, respectively, with ribs and with corrugations, will expose the same area to the heat of the furnace and be equally effective for the purpose of evaporation.

The pans must necessarily overlap the furnace-walls some little distance for support, and if the pans were set flat on the furnace-walls a considerable portion of the bottom of the pan would be thus covered, thereby reducing the evaporating capacity of the pan. To remedy this difficulty I extend the walls of the pan some little distance below the bottom of the pan, thus constituting a depending rim $A^2$, to which the ends of rib A' are fastened, the lower extremes of ribs and rim being usually flush with each other. This rim rests on the setting and consequently the entire surface of the bottom of the pan is exposed to the heat of the furnace. Usually cross-bars $A^3$ (shown in dotted lines, Fig. 1,) are laid across the furnace, where two pans meet for rims $A^2$ to rest on, thus closing the space between two pans. Each pan midway thereof has a partition $a$, extending, as shown in Fig. 1, from the front side of the pan to near the opposite side, the partition at the bottom and near the front end thereof having an opening of considerable size closed by a swinging gravity-valve $a'$, the latter opening in the direction that the liquid flows from one pan to another. (See dotted lines, Fig. 2.)

With the arrangement shown in Fig. 1, the liquid is supposed to be fed into the front left-hand corner, and the object of the partition is to establish a general circulation of the liquid throughout the pan, such partition being well known for the purpose. Valve $a'$ is usually a flat piece of metal hinged at the top side thereof to the partition, and with the pan in its normal or horizontal position the valve, by gravity, remains closed. This valve need not be fitted with great care, as a little leakage would do no harm. When a pan is tilted, as shown in Fig. 3, the valve swings open, whereby the liquid behind the partition may flow through the opening toward the next pan.

B B are pockets of the hollow and approximately semi-cylindrical variety, these pockets being located on the front side of the pan at the corners thereof. The side wall of the pan opposite the pocket is cut away flush with the internal surface of the bottom of the pan. The pockets, however, extend some distance below the bottom of the pan, usually about flush with the lower edge of the depending rim aforesaid, to which latter the pocket is secured. In tilting the pan the sediment gravitates and is washed into the pockets. Each pocket has a nozzle $b$ on the side thereof, such nozzle being closed, for instance, by stopper $b'$. A pan having been tilted, by removing the stoppers and drawing off the small quantity of liquid the sediment is entirely removed, and such liquid may be strained and afterward returned to the pan. It requires but a few moments of time to thus cleanse the pan of the sediment, whereby the bottom of the pan is less likely to be burned, and the evaporating capacity of the pan is greatly increased by keeping the pan always clean.

The pockets at the outer ends and as low down as is practical are provided with hollow trunnions C and C', the former trunnion being adapted to fit or telescope within the opposing trunnion C' of the next adjacent pan, the outer trunnion of the telescoped pair being supported by brackets C², the latter being secured to the walls of the furnace. By means of these hollow trunnions communication is established from pan to pan for the circulation of the liquid, and the trunnions, being located so low down, are always covered by the liquid in the pans, and hence the scum cannot pass from pan to pan through these trunnions, but instead is retained in the pockets, from whence it may easily be removed with a skimmer. Each pocket is provided with a sliding valve D, adapted when depressed to close the mouth of the hollow trunnion, such valve having a teat or lug $d$ projecting from the back thereof for entering loosely a hole in the lower end of valve-rod E. Rod E extends up through the bore of tube $c$, the latter being secured on top of the pocket, such tube extending up to near the top of the pan, whereby the liquid in tilting the pan never flows out through these tubes, and consequently no packing or stuffing box is required around the valve-stem. The upper end of the valve-stem is provided with a handle $e$, journaled thereon and secured by nut $e'$. The length of the valve-rod is such that with the valve in its elevated position by turning this handle so as to engage the top edge of the pan the valve is held elevated.

In operating the pans any one pan may be tilted independently of the other pans, and if the valves are opened the liquid of the tilted pan is caused to flow into the next adjacent pan, after which, by returning the pan to its normal position, the same may be supplied with fresh liquid.

What I claim is—

1. The combination, with a series of evaporating-pans each having external pockets extending below the internal surface of the bottom of the pan, substantially as indicated, of hollow trunnions connected with such pockets, such trunnions being adapted to telescope with the trunnions of the adjacent pan, substantially as set forth.

2. The combination, with the tilting pans having pockets extending below the internal surface of the bottom of the pan and hollow trunnions connecting said pockets, of sliding valves for closing the inner ends of the trunnions and having stems extending outside the pockets, substantially as set forth.

3. The combination, with the tilting pans having pockets extending below the internal surface of the bottom of the pans and hollow trunnions connecting said pockets, of sliding valves for closing the inner ends of the trunnions, valve-stems connected with the valves and extending up above the line of liquid in the pan, substantially as set forth.

4. The combination, with the tilting pans having pockets, hollow trunnions connecting said pockets and valves, substantially as indicated, of valve-stems movable longitudinally and of a length sufficient to overlap and rest on the top of the pan to hold the valves open, substantially as set forth.

5. The combination, with tilting pans having external pockets extending below the internal surface of the bottom of the pan and hollow trunnions connecting said pockets, of discharging-nozzles connected with the respective pockets, such nozzles being provided with removable stoppers or suitable devices, whereby the nozzles are opened or closed, as required.

In testimony whereof I sign this specification, in the presence of two witnesses, this 30th day of January, 1889.

GUSTAVE H. GRIMM.

Witnesses:
JAS. H. DORER,
ALBERT E. LYNCH.